(12) United States Patent
Sripathi et al.

(10) Patent No.: US 8,612,825 B2
(45) Date of Patent: *Dec. 17, 2013

(54) DATA CLASSIFICATION BASED ON CYCLIC REDUNDANCY CHECK AND DECODER METRIC

(75) Inventors: Prashant Udupa Sripathi, Santa Clara, CA (US); Jittra Jootar, Santa Clara, CA (US); Je Woo Kim, Santa Clara, CA (US); Feng Lu, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/227,884

(22) Filed: Sep. 8, 2011

(65) Prior Publication Data

US 2012/0226950 A1 Sep. 6, 2012

Related U.S. Application Data

(60) Provisional application No. 61/381,799, filed on Sep. 10, 2010.

(51) Int. Cl.
*H03M 13/00* (2006.01)
*H03M 13/03* (2006.01)

(52) U.S. Cl.
USPC ............ 714/758; 714/795; 714/704; 714/780

(58) Field of Classification Search
USPC .......................................... 714/704, 758, 780
See application file for complete search history.

(56) References Cited

U.S. PATENT DOCUMENTS

| | | | |
|---|---|---|---|
| 5,509,020 A | 4/1996 | Iwakiri et al. | |
| 5,774,496 A | 6/1998 | Butler et al. | |
| 6,732,321 B2 * | 5/2004 | Classon et al. | ................ 714/774 |
| 6,763,244 B2 | 7/2004 | Chen et al. | |
| 7,143,178 B2 | 11/2006 | Glazko et al. | |
| 7,181,170 B2 | 2/2007 | Love et al. | |
| 7,725,799 B2 | 5/2010 | Walker et al. | |
| 7,730,381 B2 | 6/2010 | Butala et al. | |
| 7,746,961 B2 | 6/2010 | Reial et al. | |
| 2004/0006462 A1 | 1/2004 | Johnson | |
| 2007/0234189 A1 | 10/2007 | Levy et al. | |
| 2009/0036155 A1 | 2/2009 | Wu et al. | |
| 2009/0075674 A1 | 3/2009 | Qahwash | |
| 2009/0241009 A1 | 9/2009 | Kong et al. | |
| 2009/0249165 A1 | 10/2009 | Gracie et al. | |
| 2011/0069631 A1 | 3/2011 | Eder et al. | |
| 2011/0083065 A1 | 4/2011 | Singh et al. | |
| 2012/0324317 A1 | 12/2012 | Sripathi et al. | |

* cited by examiner

FOREIGN PATENT DOCUMENTS

WO 2007027526 A2 3/2007

OTHER PUBLICATIONS

International Search Report and Written Opinion—PCT/US2011/051120—ISA/EPO—Nov. 28, 2011.

*Primary Examiner* — Guy Lamarre
(74) *Attorney, Agent, or Firm* — S. Hossain Beladi

(57) ABSTRACT

A method of data classification for use in a wireless communication system includes obtaining decoder metrics from a decoder. The decoder metrics correspond to data generated by the decoder. The decoder metrics include a symbol error rate (SER) and an energy metric (EM). The method also includes classifying the data into a first category if the data fails a cyclic redundancy check (CRC) check, into a second category if the data passes the CRC check and is determined to be unreliable, or into a third category if the data passes the CRC check and is determined to be reliable. A reliability of the data is determined based on the decoder metrics and an EM threshold.

30 Claims, 8 Drawing Sheets

DATA CLASSIFICATION BASED ON CYCLIC REDUNDANCY CHECK AND DECODER METRIC

I. CLAIM OF PRIORITY AND CROSS-REFERENCE TO RELATED APPLICATION

The present application claims priority to U.S. Provisional Application No. 61/381,799 filed Sep. 10, 2010, and titled "Apparatus and Method for Adaptive Signal Classification To Lower E-AGCH False Alarms," which is incorporated by reference herein in its entirety. The present application is related to U.S. patent application Ser. No. 13/227,906, filed on Sep. 8, 2011, and titled "Data Classification in a Wireless Communication System," which is incorporated by reference herein in its entirety.

II. FIELD

The present disclosure is generally related to data processing in a wireless communication system.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Such computing devices may include a receiver that operates according to a high-speed uplink packet access (HSUPA) protocol. HSUPA is a feature of 3rd Generation Partnership Project (3GPP) Release 6 that allows for increased data rates, lower scheduling delays, and reduced latency of uplink data. In wireless systems that implement the HSUPA protocol, an enhanced dedicated channel (E-DCH) is used to carry uplink data from user equipment (UE) (e.g., a wireless telephone) to a NodeB (e.g., a base station). Data rate and power of E-DCH channels are controlled by a NodeB partly by means of absolute grants transmitted to UEs over a downlink physical layer channel, E-AGCH (E-DCH absolute grant channel). To transmit an absolute grant to UEs, an error detection code (e.g., a cyclic redundancy check (CRC) code) is appended to grant-and-scope data. The combined grant-and-scope data and error detection code is encoded and punctured to produce a codeword. The codeword is then transmitted on the E-AGCH physical layer channel to UEs served by the NodeB.

The UEs may receive and decode signals carried over the E-AGCH and perform error detection (e.g., a CRC check) on the decoded data for every transmission time interval (TTI). However, the NodeB may not transmit an absolute grant in each TTI. When there is no absolute grant transmitted by the NodeB in a particular TTI, the data decoded by the UEs during that TTI is not valid (e.g., random data). However, there is a possibility that an error detection will indicate the decoded data is error-free (e.g., a CRC pass) even though no valid data was received. A false error-free data indication (i.e., a "false alarm") may cause an erroneous determination by a UE that an absolute grant was transmitted. E-AGCH false alarms may therefore have an adverse impact on network throughput and stability.

IV. SUMMARY

Data classification for use in a wireless communication system includes classifying decoded data based on decoder metrics and an error detection check. The decoder metrics may be used to determine a reliability of the data, and error detection information may be used to determine whether the decoded data passes or fails an error detection check, such as a cyclic redundancy check (CRC). The data may be classified based on a determined reliability of the data and a result of the error detection check. For example, the data (and the corresponding received signal) may be classified as having passed CRC but determined to be unreliable. One or more parameters used to classify the data based on the decoder metrics may be updated for a subsequent classification.

In a particular embodiment, a method of data classification for use in a wireless communication system includes obtaining decoder metrics from a decoder. The decoder metrics correspond to data generated by the decoder and include a first metric and a second metric. The method includes classifying the data into a first category if the data fails an error detection check, into a second category if the data passes the error detection check and is determined to be unreliable, or into a third category if the data passes the error detection check and is determined to be reliable. A reliability of the data is determined based on the decoder metrics and a threshold.

In another particular embodiment, a method of data classification for use in a wireless communication system includes obtaining decoder metrics from a decoder. The decoder metrics correspond to data generated by the decoder and include an energy metric (EM) and a symbol error rate (SER). The method includes classifying the data into a first category if the data fails a cyclic redundancy check (CRC) check, into a second category if the data passes the CRC check and is determined to be unreliable, or into a third category if the data passes the CRC check and is determined to be reliable. A reliability of the data is determined based on the decoder metrics and an EM threshold.

In a particular embodiment, a device for data classification for use in a wireless communication system includes logic to obtain decoder metrics from a decoder. The decoder metrics correspond to data generated by the decoder and include a first metric and a second metric. The device includes a classifier to classify the data into a first category if the data fails an error detection check, to classify the data into a second category if the data passes the error detection check and is determined to be unreliable, and to classify the data into a third category if the data passes the error detection check and is determined to be reliable. A reliability of the data is determined based on the decoder metrics and a threshold.

In another particular embodiment, a device for data classification for use in a wireless communication system includes logic to obtain decoder metrics from a decoder. The decoder metrics correspond to data generated by the decoder and include an energy metric (EM) and a symbol error rate (SER). The device includes a classifier to classify the data into a first category if the data fails a cyclic redundancy check (CRC) check, into a second category if the data passes the CRC check and is determined to be unreliable, or into a third category if the data passes the CRC check and is determined to be reliable. A reliability of the data is determined based on the decoder metrics and an EM threshold.

One particular advantage provided by at least one of the disclosed embodiments is that random or erroneous data may be identified as unreliable even though the data passes the error detection check. For example, random data that passes a CRC check may be identified as unreliable. Such unreliable data may be classified accordingly and subsequently discarded or processed in a manner appropriate for data classified into a corresponding category.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
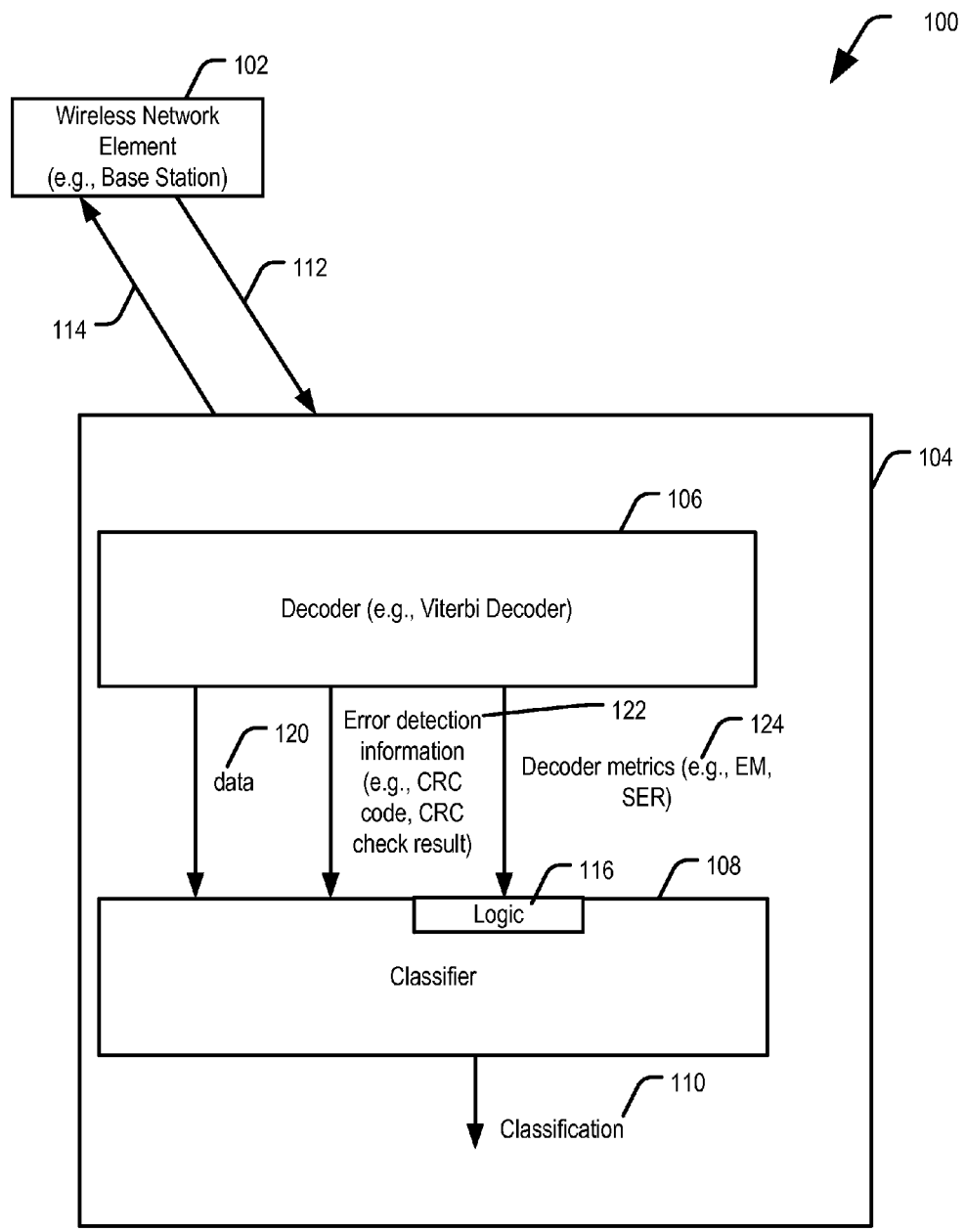
FIG. 1 is a block diagram of a particular embodiment of a wireless communication system that includes a device configured to perform data classification.

Referring to FIG. 1, a particular illustrative embodiment of a wireless communication system to enable signal classification is depicted and generally designated 100. The wireless communication system 100 includes a wireless network element 102 and a device 104 configured to perform data classification for use in the wireless communication system 100. The wireless network element 102 may be a NodeB or a base station. To illustrate, the wireless network element 102 may communicate with the device 104 over a radio network. For example, the wireless network element 102 may transmit a downlink signal 112 to the device 104. Similarly, the device 104 may transmit an uplink signal 114 to the wireless network element 102. In a particular embodiment, the device 104 may be a portable communication device, such as a mobile phone, a smartphone, a laptop computer, a tablet computer, a personal digital assistant (PDA), a portable media player, another portable electronic device operable to perform wireless communication, or any combination thereof.

In a particular embodiment, the device 104 is configured to classify data into categories and to indicate a classification 110 of the data 120. The device 104 may include a decoder 106 and a classifier 108. The decoder 106 is configured to receive a signal transmitted by the wireless network element 102. To illustrate, the decoder 106 may receive the downlink signal 112 from the wireless network element 102. The decoder 106 is further configured to decode the received signal and to generate decoded output data. For example, the decoder 106 may generate data 120 by decoding the received signal. In a particular embodiment, the decoder 106 may be a Viterbi decoder for convolutional codes.

The decoder 106 may be configured to generate error detection information 122 that corresponds to the data 120. The error detection information 122 may include an error detection code that is decoded from a received signal, a result of an error detection check performed by the decoder on the data 120, or both. For example, the error detection information 122 may include a cyclic redundancy check (CRC) code that is decoded by the decoder 106 from the downlink signal 112. The error detection code provided by the decoder 106 may be used by the classifier 108 to perform an error detection check on the data 120. Alternatively, the error detection information 122 may include a result of an error detection check performed by the decoder 106 or another component of the device 104. For example, the error detection check may be performed based on a CRC code. In a particular embodiment, the CRC code may be a 16-bit CRC code.

In a particular embodiment, the decoder 106 is configured to generate decoder metrics 124 corresponding to the data 120. The decoder metrics 124 may include a first metric and a second metric. The first metric may correspond to a scale invariant metric and the second metric may correspond to a scale variant metric. For example, the first metric may include a symbol error rate (SER), and the second metric may include an energy metric (EM), such as a correlation energy metric. The decoder metrics 124 may be used by the classifier 108 to determine a reliability of the data.

The classifier 108 is configured to classify the data 120 based on a reliability of the data 120 and a result of an error detection check performed on the data 120. The reliability of the data 120 may be determined based on the decoder metrics 124 and a metric threshold. For example, the classifier 108 may include logic 116 to obtain decoder metrics 124 from a decoder 106. The reliability of the data 120 may be determined based on the decoder metrics 124 and an EM threshold, as described with respect to FIGS. 3-5. To illustrate, the classifier 108 may determine the data 120 to be unreliable if a first metric of the decoder metrics 124 satisfies a first threshold. For example, the data 120 is determined to be unreliable if the SER satisfies a first SER threshold. The SER may satisfy the first threshold if the SER exceeds the first SER threshold. The classifier 108 may also determine the data 120 to be unreliable if the first metric of the decoder metrics 124 satisfies a second threshold and a second metric of the decoder metrics 124 fails to satisfy the metric threshold. For example, the data 120 may be determined to be unreliable if the SER satisfies a second SER threshold and an EM fails to satisfy an EM threshold. The SER may satisfy the second SER threshold if the SER exceeds the second threshold. The EM may fail to satisfy the EM threshold if the EM is below the EM threshold.

In a particular embodiment, the classifier 108 may receive error detection information 122 including a result of an error detection check performed by the decoder 106. For example, the error detection information 122 may include a result of a CRC check performed by the decoder 106. In another embodiment, the error detection information 122 may include an error detection code corresponding to the data 120. When the error detection information 122 includes an error detection code, the classifier 108 may perform an error detection check on the data 120 based on the error detection code.

For example, the classifier 108 may perform a CRC check on the data 120 based on a CRC code received from the decoder 106.

In a particular embodiment, the classifier 108 may classify the data 120 into one of three categories and indicate a classification 110. To illustrate, the classifier 108 may classify the data 120 into a first category if the data 120 fails an error detection check. The classifier 108 may classify the data 120 into a second category if the data 120 passes the error detection check and is determined to be unreliable. The classifier 108 may classify the data 120 into a third category if the data 120 passes the error detection check and is determined to be reliable. For example, the classifier 108 may classify the data 120 into the first category if the data 120 fails a cyclic redundancy check (CRC) check, into the second category if the data 120 passes the CRC check and is determined to be unreliable, or into the third category if the data 120 passes the CRC check and is determined to be reliable.

During operation, the device 104 may receive a signal from the wireless network element 102. The decoder 106 may decode the received signal and generate the data 120. The decoder 106 may also generate the error detection information 122 corresponding to the data 120. For example, the decoder 106 may perform an error detection check (e.g., a CRC check) on the data 120 or on other data corresponding to the data 120 and may generate a result of the error detection check, such as a result of a CRC check. The decoder 106 may also generate the decoder metrics 124 including a first metric and a second, such as an SER and an EM, corresponding to the data 120.

The classifier 108 may receive the data 120, the error detection information 122, and the decoder metrics 124 from the decoder 106. The classifier 108 may determine a reliability of the data 120 based on the decoder metrics 124 and a metric threshold, such as an EM threshold. For example, the classifier 108 may determine the data 120 to be unreliable if the first metric satisfies (e.g., exceeds) a first threshold. The classifier 108 may also determine the data 120 to be unreliable if the first metric satisfies a second threshold and a second metric fails to satisfy the metric threshold.

The classifier 108 may classify the data 120 into the first category if the result of the error detection check indicates the data 120 failed the error detection check. The classifier 108 may classify the data 120 into the second category if the result of an error detection check indicates the data 120 passed the error detection check but classifier 108 determines the data 120 to be unreliable. Additionally, the classifier 108 may classify the data 120 into the third category if the result of the error detection check indicates the data 120 passed the error detection check and the classifier 108 determined the data 120 to be reliable (i.e., the data is not associated with characteristics corresponding to unreliable data, such as high SER and/or low EM.

By classifying the data 120 into categories and indicating the classification 110, the data 120 may be processed in a manner that is appropriate to each category. For example, the data 120 that is classified into the first category (e.g., the fail category) may be discarded without further processing. The data 120 that is classified into the second category (e.g., the false CRC pass category) may be discarded without further processing or, alternatively, may be further processed in another manner. The data 120 that is classified into the third category (e.g., the pass category) may be transferred to subsequent communication protocol layers.

Figure 2:
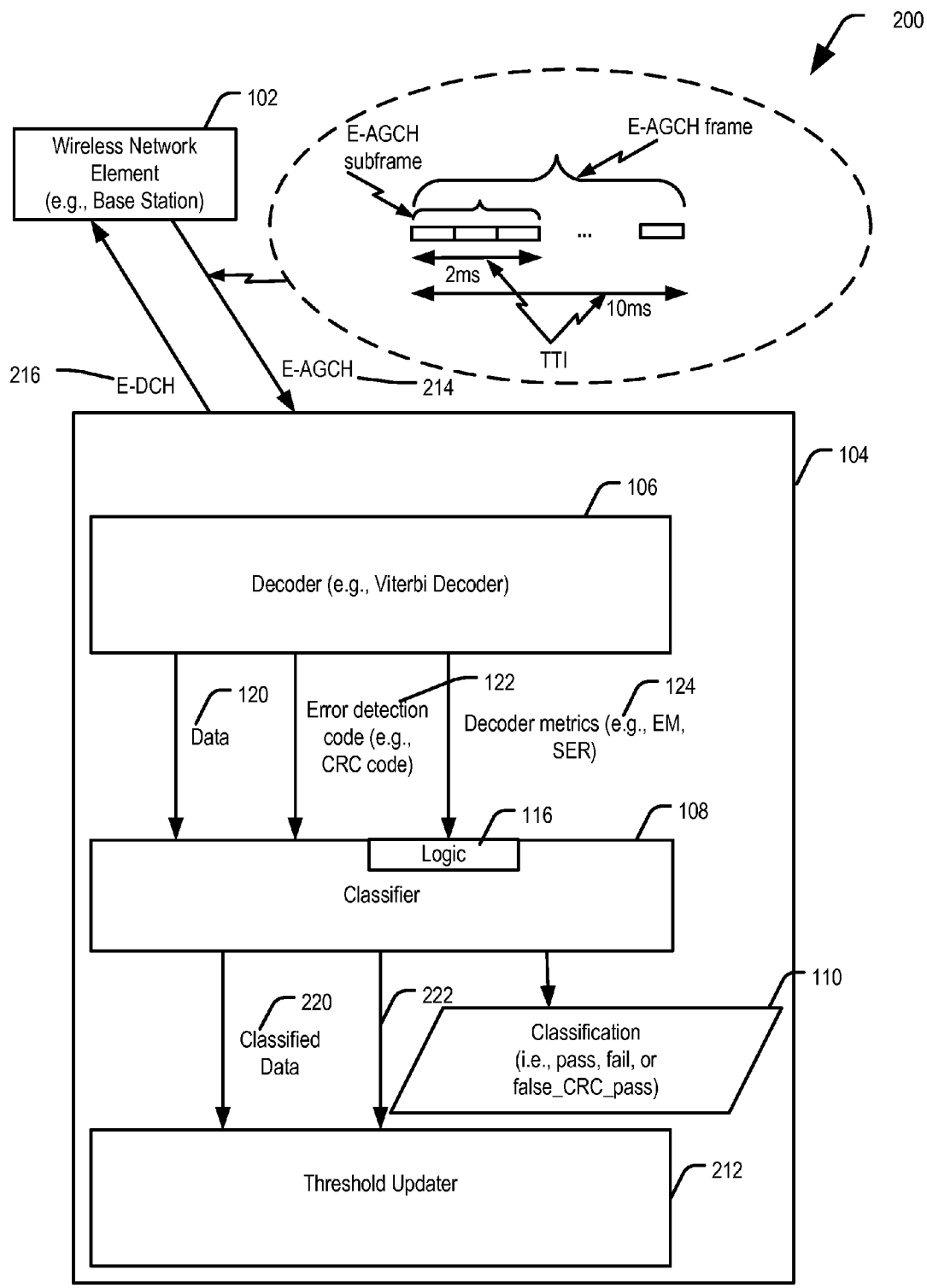
FIG. 2 is a block diagram of another particular embodiment of the wireless communication system of FIG. 1 including another particular embodiment of the device 104 of FIG. 1.

Referring to FIG. 2, a particular illustrative embodiment of the wireless communication system of FIG. 1 is depicted and generally designated 200. In a particular embodiment, the wireless communication system 200 may implement a high-speed uplink packet access (HSUPA) protocol, which is a 3rd Generation Partnership Project (3GPP) Release 6 feature that allows for increased data rates, lower scheduling delays, and reduced latency of uplink data. The wireless communication system 200 includes the wireless network element 102 and the device 104 configured to perform data classification for use in the wireless communication system 200. For example, the device 104 may transmit an uplink signal to the wireless network element 102 over an enhanced dedicated channel (E-DCH) 216. Similarly, the wireless network element 102 may transmit a downlink signal to the device 104 over an E-DCH absolute grant channel (E-AGCH) 214. To illustrate, E-AGCH 214 is compliant with the HSUPA protocol.

The device 104 includes the decoder 106, the classifier 108, and a threshold updater 212. The decoder 106 is configured to decode the data 120 from a signal carried on the E-AGCH 214. For example, the signal may be carried in an E-AGCH frame. Alternatively, the signal may be carried in an E-AGCH subframe. The decoder 106 may be configured to generate the data 120, the error detection information 122 corresponding to the data 120, and the decoder metrics 124 as described with respect to FIG. 1.

In a particular embodiment, the data 120 decoded from a received signal may be associated with a transmission time interval (TTI). To illustrate, a signal that is carried in an E-AGCH frame may correspond to a 10 millisecond TTI, and a signal that is carried in an E-AGCH subframe may correspond to a 2 millisecond TTI. The decoder metrics 124 and the data 120 may also be associated with the same TTI. For example, the decoder metrics 124 and the data 120 may be associated with the same 10 millisecond TTI. Alternatively, the data 120 may be associated with a current TTI and the decoder metrics 124 may be associated with a prior TTI.

As described with respect to FIG. 1, the classifier 108 may use the decoder metrics 124 and a metric threshold to determine a reliability of the data 120. The metric threshold may be initialized to a first threshold value before determining the reliability of the data 120. To illustrate, the data 120 may be determined to be unreliable if the first metric satisfies a first threshold. The data 120 may also be determined to be unreliable if the first metric satisfies a second threshold and the second metric fails to satisfy a metric threshold.

For example, the first metric may be an SER and the second metric may be an EM. The SER, the EM, and the data 120 may correspond to the same TTI. The data 120 may be determined to be unreliable if the SER satisfies a first SER threshold. The data 120 may also be determined to be unreliable if the SER satisfies a second SER threshold and the EM fails to satisfy an EM threshold. The SER may satisfy the first threshold if the SER exceeds the first SER threshold. Similarly, the SER may satisfy the second SER threshold if the SER exceeds the second SER threshold. The EM may fail to satisfy the EM threshold if the EM fails to exceed the EM threshold.

The EM metric may be initialized to a first threshold value before determining the reliability of the data 120. For example, the EM threshold may be initialized when a new uplink call is established between the device 104 and the wireless network element 102. The EM threshold may also be initialized when an uplink serving cell associated with the device 104 changes. In a particular embodiment, the first SER threshold, the second SER threshold, and the EM threshold may be determined and optimized statically using simulation results or laboratory/field results.

In a particular embodiment, the classifier 108 may receive error detection information 122 including a result of an error detection check performed by the decoder 106. Alternatively, the classifier 108 may receive an error detection code corresponding to the data 120. For example, the classifier 108 may receive from the decoder 106 a result of a CRC check corresponding to the data 120 or may receive a CRC code corresponding to the data 120. When the classifier 108 receives a CRC code from the decoder, the classifier 108 may perform a CRC check on the data 120 based on the CRC code. The result of a CRC check received from the decoder 106 or determined by the classifier 108 may indicate whether the data 120 passes or fails the CRC check.

The classifier 108 may classify the data 120 into one of three categories in a similar manner as described with respect to FIG. 1 and output an indication of the classification 110. For example, the classifier 108 may classify the data 120 into the first category if the data 120 fails a CRC check, into the second category if the data 120 passes the CRC check and is determined to be unreliable, or into the third category if the data 120 passes the CRC check and is determined to be reliable. In a particular embodiment, the first category corresponds to a fail category, the second category corresponds to a false CRC pass category, and the third category corresponds to a pass category.

In a particular embodiment, the threshold updater 212 is configured to receive classification information 222 including the reliability of the data 120 and the decoder metrics 124 from the classifier 108. Based on the classification information 222, the threshold updater 212 may update the metric threshold (e.g., EM threshold). The threshold updater 212 may set the metric threshold to a first threshold value in response to determining, by the classifier 108, that the data is unreliable. The threshold updater 212 may update the metric threshold to a first update threshold value based on the first metric (e.g., SER) and a low threshold (e.g., a low SER threshold). The threshold updater 212 may also update the metric threshold to a second update threshold value based on the first metric (e.g., SER) and a high threshold (e.g., high SER threshold).

For example, the first metric may be an SER, the second metric may be an EM, and the metric threshold may be an EM threshold. The EM threshold may be set to a first threshold value (e.g., set to zero) in response to classifying the data 120 into a fail category. The EM threshold may also be set to a first threshold value (e.g., set to zero) in response to classifying the data 120, by the classifier 108, into a false CRC pass category (which corresponds to the data 120 that passed a CRC check but was found to be unreliable in a current TTI). The EM threshold may be updated to a first update threshold value in response to determining that the SER fails to satisfy a low SER threshold. The SER may fail to satisfy the low SER threshold if the SER is below the low SER threshold. The EM threshold may be updated to a second update threshold value in response to determining that the SER satisfies a high SER threshold. The SER may satisfy the high SER threshold if the SER exceeds the high SER threshold. The first update threshold value may be determined based on a multiplicative coefficient and an infinite impulse response (IIR) coefficient. The second update threshold value may be determined based on the infinite impulse response (IIR) coefficient, the multiplicative coefficient, and the EM. In a particular embodiment, the IIR coefficient is between 0 and 1.

During operation, the device 104 may receive a signal, such as a signal carried in an E-AGCH frame, from the wireless network element 102. The decoder 106 may decode the signal and generate data 120 and decoder metrics 124. For example, the decoder metrics 124 may include a scale invariant metric (e.g., SER) and a scale variant metric (e.g., EM). The decoder 106 may also generate error detection information 122 corresponding to the data 120. For example, the decoder 106 may perform a CRC check on the data 120 or on other data corresponding to the data 120 and generate a result of the CRC check.

The classifier 108 may receive the data 120, the error detection information 122, and the decoder metrics 124 from the decoder 106. The classifier 108 may determine a reliability of the data 120 based on the decoder metrics 124 and a metric threshold (e.g., an EM threshold). The classifier 108 may classify the data 120 in each TTI into one of three categories. For example, the classifier 108 may classify the data 120 into a fail category if a result of a CRC check indicates the data 120 failed the CRC check. The classifier 108 may classify the data 120 into a false CRC pass category if a result of a CRC check indicates the data 120 passed the CRC check and the classifier 108 determines the data 120 to be unreliable. The classifier 108 may classify the data 120 into a pass category if a result of a CRC check indicates the data 120 passed the CRC check and the classifier 108 determined the data 120 to be reliable.

An illustrative operation of the classifier 108 is further described below by means of a pseudo-code. The pseudo-code may run in each TTI with the EM, SER, and CRC result corresponding to a particular TTI. In the pseudo-code, THRESHOLD maybe initialized to 0 when an enhanced uplink (EUL) call is established between the device 104 and the wireless network element 102 or when an EUL serving cell changes. Further, the initialization of THRESHOLD or setting THRESHOLD to 0 may be performed by the classifier 108 or the threshold updater 210.

```
IF (CRC FAIL)
    {STATUS = FAIL ;}
ELSE IF (SER > SER_HIGH_STATUS)
    {STATUS = FALSE_CRC_PASS; THRESHOLD = 0;}
    (Unreliable)
ELSE IF ((SER > SER_LOW_STATUS) AND (EM < THRESHOLD)
    {STATUS = FALSE_CRC_PASS; THRESHOLD = 0;}
    (Unreliable)
ELSE
    {STATUS = PASS;} (Reliable)
```

If the data 120 is classified in a pass category (e.g., STATUS=PASS in the above pseudo-code), the threshold updater 212 may update the metric threshold (e.g., the EM threshold) based on the first metric (e.g., SER) and high/low thresholds related to the first metric. The threshold updater 210 may increase the metric threshold if the first metric corresponding to a current TTI is above a high threshold. The threshold updater 210 may reduce the metric threshold if the first metric corresponding to the current TTI is below a low threshold. For example, the threshold updater may lower the EM threshold (i.e., reduce reliance on the EM) for checking reliability of data in a next TTI when the SER associated with the current TTI is below a low SER threshold. The threshold updater may increase the EM threshold (i.e., increase reliance on the EM) for checking reliability of data in a next TTI when the SER associated with the current TTI is above a high SER threshold. An illustrative operation of the threshold updater 212 is described below by means of a pseudo-code. The pseudo-code may run in each TTI.

```
IF (SER < SER_LOW_THRESHOLD)
    {THRESHOLD = THRESHOLD*α}
```

```
ELSE IF (SER > SER_HIGH_THRESHOLD)
    {THRESHOLD = THRESHOLD*α + ζ*EM*(1- α)}
```

In the above pseudo-code of the illustrative operation of the threshold updater 212, the following parameters and illustrative values may be used:

α is the IIR filter coefficient satisfying 0<α<1, (e.g. a may be 0.1)
ζ is an empirically determined multiplicative coefficient, (e.g. ζ may be 1.3)
SER_HIGH_STATUS=16
SER_LOW_STATUS=8
SER_HIGH_THRESHOLD=13
SER_LOW_THRESHOLD=8

Another illustrative operation of the classifier 108 is further described below by means of a pseudo-code. The pseudo-code may run in each TTI with the EM, SER, CRC result corresponding to a particular TTI. In the pseudo-code, SCALE may be initialized to 0 when an enhanced uplink (EUL) call is established or when an EUL serving cell changes. Further, initialization of SCALE or setting SCALE to 0 may be performed by the classifier 108 or the threshold updater 210.

```
THRESHOLD = ζ*SCALE
IF (CRC FAIL)
    {STATUS = FAIL ;}
ELSE IF (SER > SER_HIGH_STATUS)
    {STATUS = FALSE_CRC_PASS; SCALE = 0;} (Unreliable)
ELSE IF ((SER > SER_LOW_STATUS) AND (EM < THRESHOLD))
    {STATUS = FALSE_CRC_PASS; SCALE = 0;} (Unreliable)
ELSE
    {STATUS = PASS;} (Reliable)
```

Another illustrative operation of the threshold updater 212 is described below by means of a pseudo-code. The pseudo-code may run in each TTI.

```
IF (SER < SER_LOW_SCALE)
    {SCALE = SCALE*α}
ELSE IF (SER > SER_HIGH_SCALE)
    {SCALE = SCALE*α + EM*(1- α)}
```

In the above pseudo-code of the illustrative operation of the threshold updater 212, the following parameters and illustrative values may be used:

α is the IIR filter coefficient satisfying 0<α<1, (e.g. a may be 0.9)
ζ is an empirically determined multiplicative coefficient, (e.g. ζ may be 1.3)
SER_HIGH_STATUS=16
SER_LOW_STATUS=8
SER_HIGH_SCALE=13
SER_LOW_SCALE=8

By classifying the data 120 into categories, the data 120 may be processed in a manner that is appropriate to a category. For example, the data 120 that is classified into the second category (e.g., the false CRC pass category) may be discarded without further processing or, alternatively, may be further processed in another manner. Identifying data that is erroneously identified as passing a CRC check may enable a reduction of false alarms. To illustrate, identifying random data received over an E-AGCH may reduce a number of false grants that are erroneously recognized by UEs as actual grants transmitted by a base station.

Figure 3:
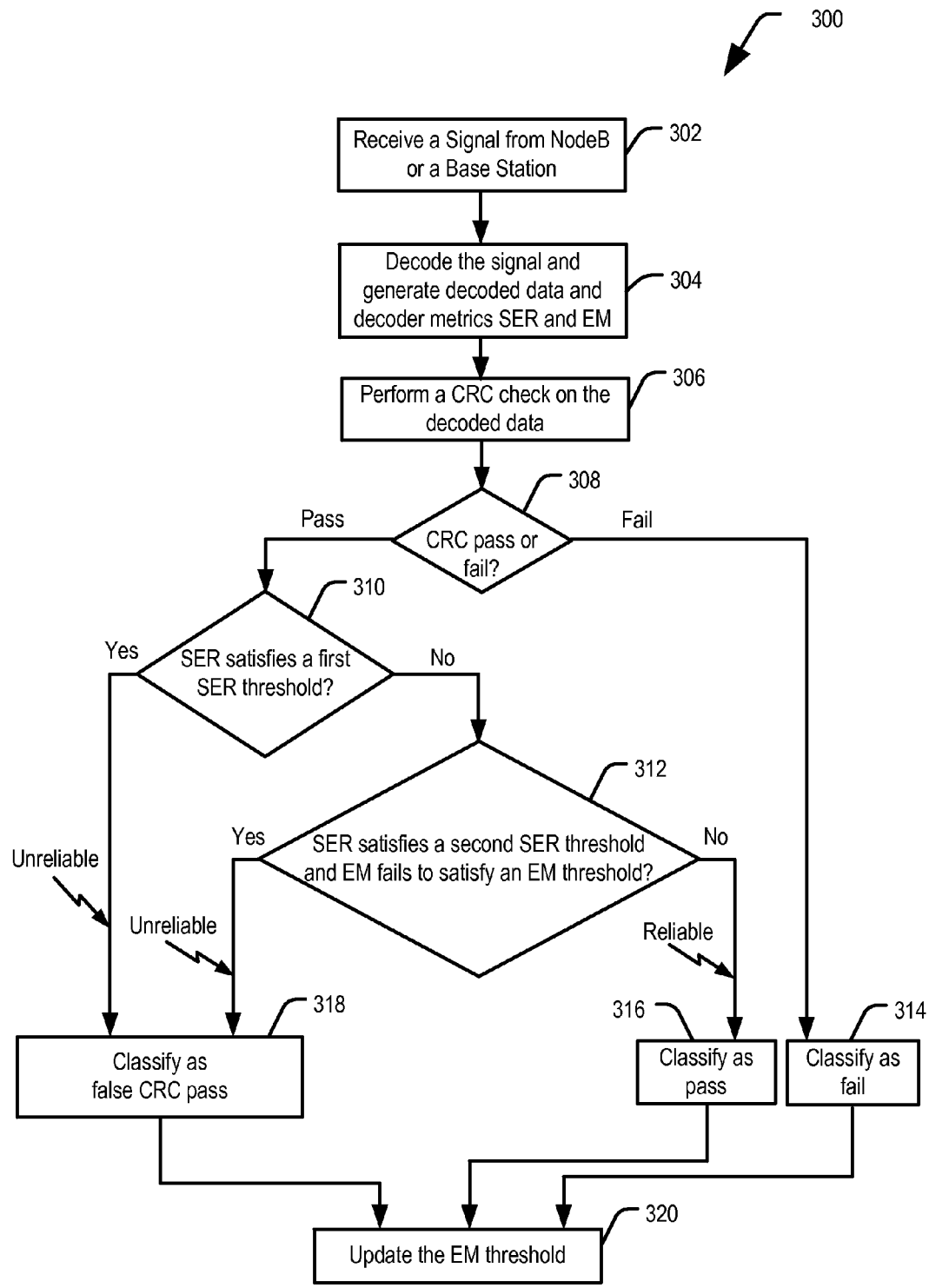
FIG. 3 is a flow chart of a particular embodiment of a method of data classification for use in a wireless communication system.

Referring to FIG. 3, a particular illustrative embodiment of a method of data classification for use in a wireless communication system is illustrated. The method 300 includes receiving a signal from a NodeB or a base station, at 302. As illustrated in FIG. 1, the device 104 may receive a downlink signal, such as the downlink signal 112, from the wireless network element 102. The wireless network element 102 may be a NodeB or a base station. Similarly, a signal carried over an E-AGCH 214 of FIG. 2 may be received by the device 104.

The method 300 further includes decoding the signal and generating decoded data and decoder metrics SER and EM, at 304. For example, the decoder 106 of FIGS. 1 and 2 may decode the signal received from the wireless network element 102 and generate data 120. The decoder 106 may also generate decoder metrics 124 including SER and EM.

A CRC check is performed on the decoded data, at 306. To illustrate, the decoder 106 or the classifier 108 of FIGS. 1 and 2 may perform a CRC check on the data 120 generated by the decoder 106. When the decoder 106 performs the CRC check, the decoder 106 may provide the result of the CRC check to the classifier 108. A determination is made whether the decoded data passed or failed the CRC check, at 308. For example, the classifier 108 of FIGS. 1 and 2 may determine whether the data 120 passed or failed a CRC check based on the result of the CRC check.

In response to determining that the decoded data failed the CRC check, at 308, the decoded data is classified as "fail", at 314. To illustrate, the classifier 108 of FIGS. 1 and 2 may classify the data 120 into a fail category in response to determining that the data 120 failed the CRC check. Otherwise, in response to determining that the decoded data passed the CRC check, at 308, a determination is made, at 310, whether SER satisfies a first SER threshold. The classifier 108 may determine that the data 120 is unreliable if the SER satisfies the first SER threshold. For example, the classifier 108 may determine that the SER satisfies the first SER threshold if the SER exceeds the first SER threshold.

In response to determining that the SER fails to satisfy the first SER threshold, at 310, a determination is made, at 312, whether the SER satisfies a second SER threshold and EM fails to satisfy an EM threshold. The classifier 108 may determine that the data 120 is unreliable if the SER satisfies the second SER threshold and the EM fails to satisfy the EM threshold. The classifier 108 may determine that the SER satisfies the second SER threshold if the SER exceeds the second SER threshold. Similarly, the classifier 108 may determine that the EM fails to satisfy the EM threshold if the EM is below the EM threshold. The classifier 108 may determine that the data 120 is reliable if the SER fails to satisfy the second SER threshold and the EM satisfies the EM threshold.

In response to determining that the SER fails to satisfy the second SER threshold and the EM satisfies the EM threshold, at 312, the decoded data may be classified as "pass," at 316. To illustrate, the classifier 108 of FIGS. 1 and 2 may classify the data 120 into a pass category in response to determining that the data 120 passed the CRC check and the data 120 is reliable. In response to determining that the data is unreliable, at 310 and at 312, the decoded data may be classified as a "false CRC pass," at 318. For example, the classifier 108 of FIGS. 1 and 2 may classify the data 120 into a false CRC pass category in response to determining that the data 120 passed the CRC check but is unreliable. The method 300 also includes updating the EM threshold, at 320, as described with respect to FIG. 2. For example, the threshold updater 210 may update the EM threshold based on SER and EM.

The method 300 of FIG. 3 may be implemented by a processing unit such as a central processing unit (CPU), a digital signal processor (DSP), a controller, an application-specific integrated circuit (ASIC), a field-programmable gate array (FPGA) device, another hardware device, a firmware device, or any combination thereof. As an example, the method of FIG. 3 can be performed by or in response to signals or commands from a processor that executes instructions, as described with respect to FIG. 6.

Figure 4:
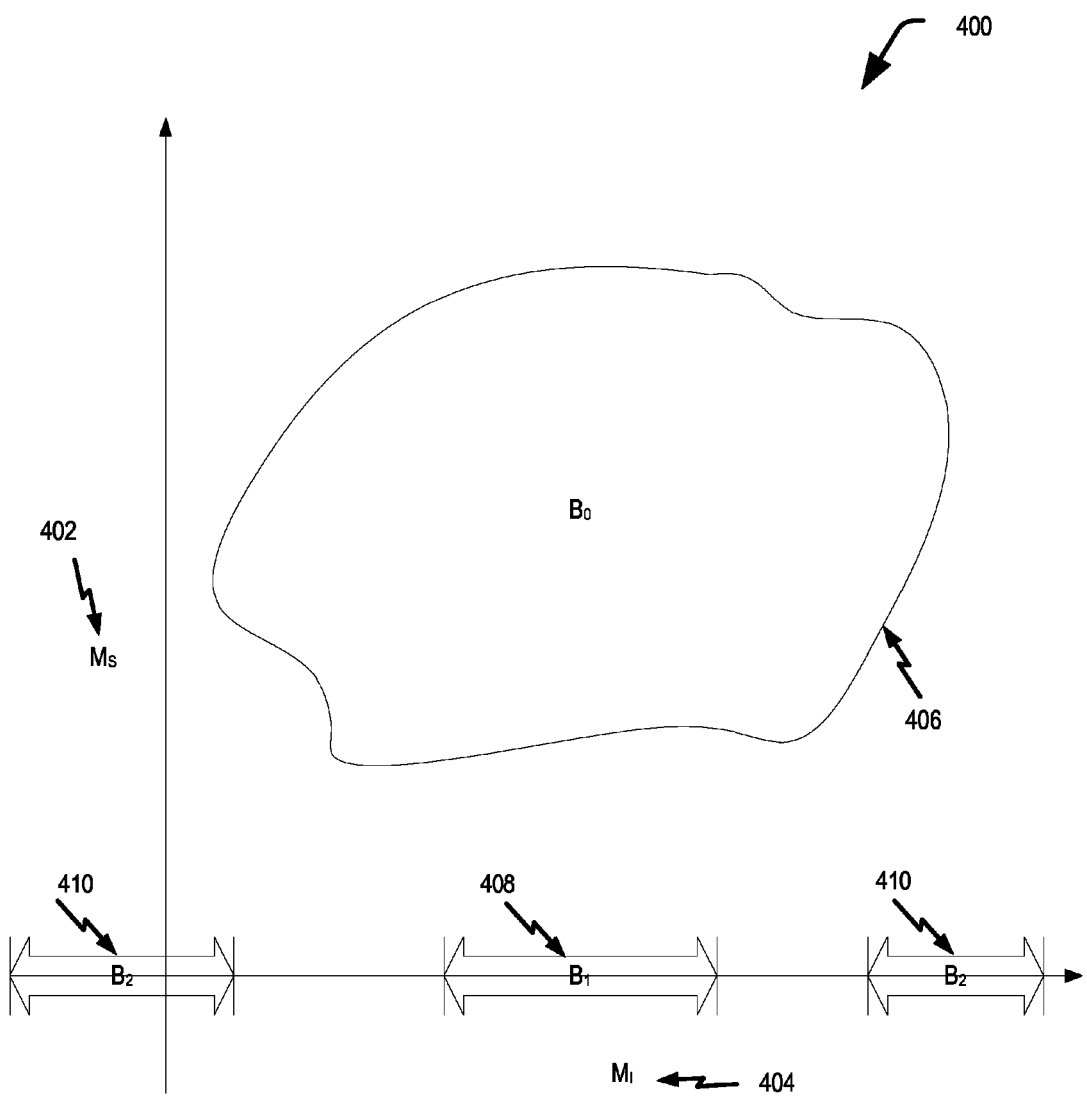
FIG. 4 is a diagram of a particular illustration of various reliability regions corresponding to decoded data.

Referring to FIG. 4, a particular illustration of various reliability regions corresponding to decoded data is shown. For example, the data may be decoded by a Viterbi decoder. Accordingly, let $\{x_i\}_{i=1}^{N}$, $x_i \notin R$ represent an input sequence to a Viterbi decoder;

let $\{b_i\}_{i=1}^{M}$, $b_i \notin \{-1, +1\}$ represent a decoded output; and let $\{e_i\}_{i=1}^{N}$, $e_i \notin \{-1, +1\}$ represent a re-encoded codeword obtained by encoding $\{b_i\}$ as $\{b_i\}$ would be encoded at a transmitter.

In addition to the decoded codeword, the Viterbi decoder may be configured to generate one or more metrics. These metrics are functions of the input sequence and a given metric may be denoted as $M(\{x_i\})$.

Two classes of metrics (i.e., scale variant metrics and scale invariant metrics) may be considered. Scale variant metrics satisfy the following criteria:

$$M(\{x_i\}) \neq M(\{\alpha x_i\})$$

Examples of scale variant metrics are:
Correlation energy metric (EM): $E = \Sigma e_i x_i$;
Moments of order j: $m_j = \Sigma |x_i|^j$;
$A_0$: Viterbi path metric at state 0 at the end of the Viterbi decoding operation as specified in Sec A.1.2 of 3GPP Technical Specification (TS) 25.212;
$A_{max}$: Maximum Viterbi path metric among all survivors at the end of the Viterbi decoding operation as specified in Sec A.1.2 of 3GPP TS 25.212; and
$A_{min}$: Minimum Viterbi path metric among all survivors at the end of the Viterbi decoding operation as specified in Sec A.1.2 of 3GPP TS 25.212.

Scale invariant metrics satisfy the following criteria:

$$M(\{x_i\}) = M(\{\alpha x_i\})$$

Examples of scale invariant metrics are:
Symbol Error Rate (SER): $\Sigma_{i=1}^{N} S(x_i, e_i)$, where $$\delta(y) = \begin{cases} 1 & \text{if } y < 0 \\ 0 & \text{if } y \geq 0; \end{cases}$$

$$S = 10 \log_{10} \frac{A_0 - A_{min}}{A_{max} - A_{min}},$$

as defined in Sec A.1.2 of 3GPP TS 25.212; and $$P = -10 \log_{10} \frac{E}{\sqrt{m_2 - m_1^2}}.$$

FIG. 4 illustrates a two-dimensional space formed by values of a scale variant metric $M_S$ 402 and a scale invariant metric $M_I$ 404. A first region $B_0$ 406 includes values of $M_S$ 402 and $M_I$ 404, where a function of $M_S$ 402 and $M_I$ 404 satisfy a criterion. To illustrate, Bo 406 includes values of $((M_S 402)/\text{SCALE})$ and $M_I$ 404 that correspond to an unreliable decode. A second region $B_1$ includes values of $M_I$ 404 that correspond to a low probability of unreliable decode. A third region $B_2$ includes values of $M_I$ 404 that correspond to a high probability of unreliable decode. "SCALE" is an adaptive scale factor that may be updated based on at least one of the decoder metrics. A particular embodiment of a method of data classification based on the scale variant metric $M_S$ 402 and the scale invariant metric $M_I$ 404 is described below by means of a pseudo-code:

1. Initialize adaptive scale factor SCALE:
   Initialize SCALE to 0 when an enhanced uplink (EUL) call is established, serving cell changes, or when certain relevant physical configurations are updated (e.g., switching a receive antenna on or off).
2. Classify as PASS, FAIL, FALSE_CRC_PASS:
   IF (CRC FAIL)
   {STATUS = FAIL ;}

ELSE IF (SCALE ≠ 0) AND $\left(\frac{M_S}{\text{SCALE}}, M_I\right) \in \mathcal{B}_0$ {STATUS = FALSE_CRC_PASS; SCALE = 0;}
   ELSE
   {STATUS = PASS;}
3. Scale adaptation:
   IF ($M_I \in \mathcal{B}_1$)
   {SCALE = SCALE*α}
   ELSE IF ($M_I \in \mathcal{B}_2$)
   {SCALE = SCALE*α + $M_S$*(1 − α)}

In the above described method, $\mathcal{B}_0$ 406, $\mathcal{B}_1$ 408, and $\mathcal{B}_2$ 410 may be determined and optimized statically via simulations or based on laboratory and/or field results. The adaptive scale factor SCALE may be updated based on at least one of the decoder metrics. For example, the adaptive scale factor SCALE is updated based on the scale variant metric $M_S$ 402 in the above pseudo-code.

In an illustrative example, $\mathcal{B}_0$ 406 represents the region in the two-dimensional space of $$\left(\frac{M_S}{\text{SCALE}}, M_I\right)$$

that corresponds to an unreliable decode. $\mathcal{B}_1$ 408 represents the region in the one dimensional space of $M_I$ 404 that corresponds to a high LLR of genuine transmission. LLR is the log likelihood ratio and may be defined as the log of the ratio of the probability of a genuine transmission to the probability of the absence of a genuine transmission, where both probabilities may be conditioned on the observation of $M_I$ 404. $\mathcal{B}_2$ 410 represents the region in the one dimensional space of $M_I$ 404 that corresponds to a low LLR of genuine transmission.

Figure 5:
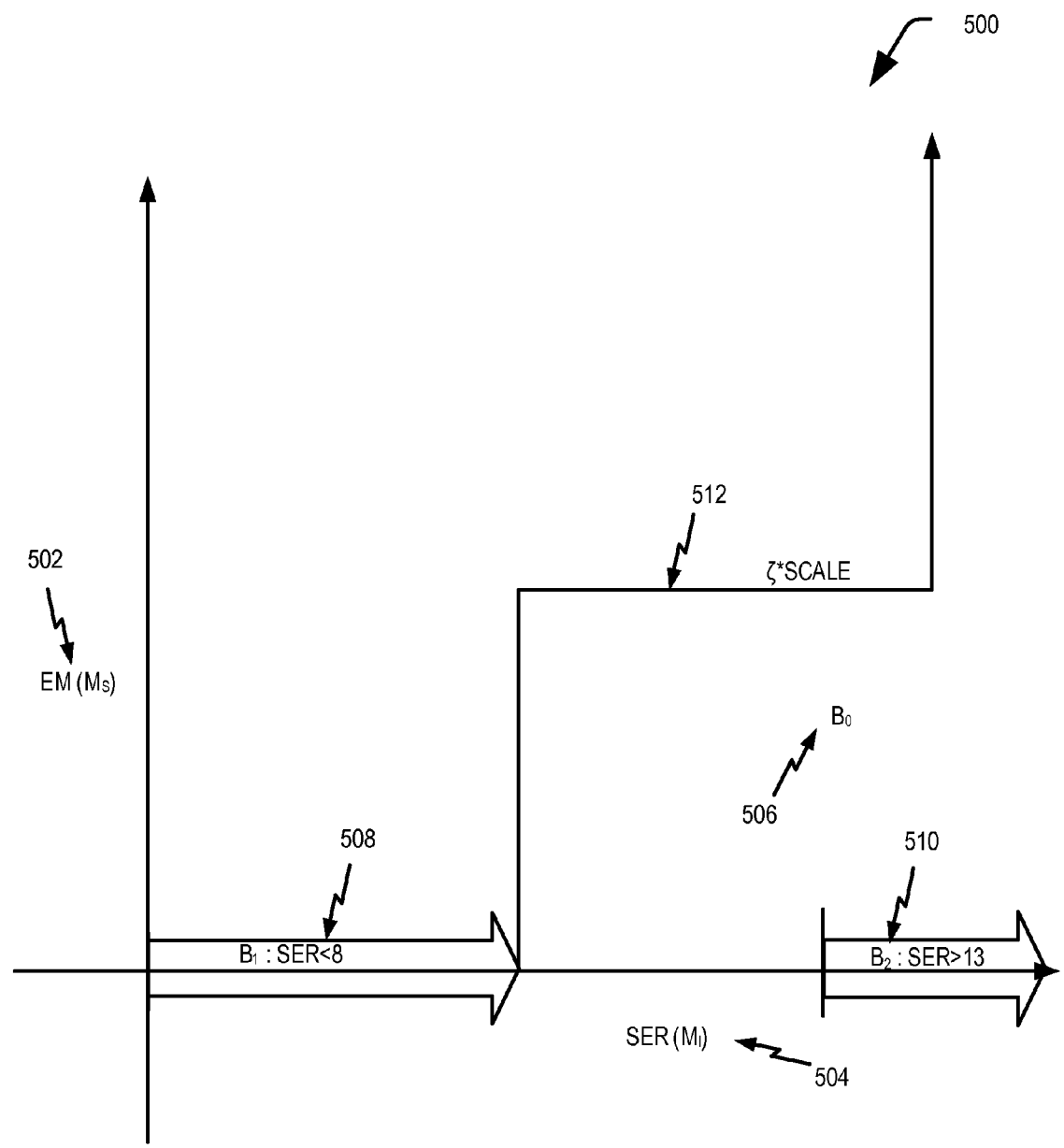
FIG. 5 is an illustrative example of the various reliability regions illustrated with respect to FIG. 4.

Referring to FIG. 5, a particular illustration of the various reliability regions illustrated with respect to FIG. 4 is provided. The scale variant metric $M_S$ 402 of FIG. 4 is represented by EM 502, and the scale invariant metric $M_I$ 404 of FIG. 4 is represented by SER 504. The region $B_0$ 506 on the right side of the graph line 512 represents a two-dimensional space that corresponds to unreliable decode of data. The region $B_1$ 508 represents a region in a one-dimensional space of the scale invariant metric SER 504. The region $B_1$ 508 may correspond to a high LLR of genuine transmission. For example, the region $B_1$ 508 may correspond to SER values of less than 8.

The region $B_2$ 510 represents another region in the one-dimensional space of the scale invariant metric SER 504. The region $B_2$ 510 may correspond to a low LLR of genuine transmission. For example, the region $B_2$ 510 may correspond to SER values of greater than 13. To illustrate, decoded data with an associated SER in region $B_2$ 510 is likely to be less reliable than decoded data that is associated with SER in region $B_1$ 508.

Figure 6:
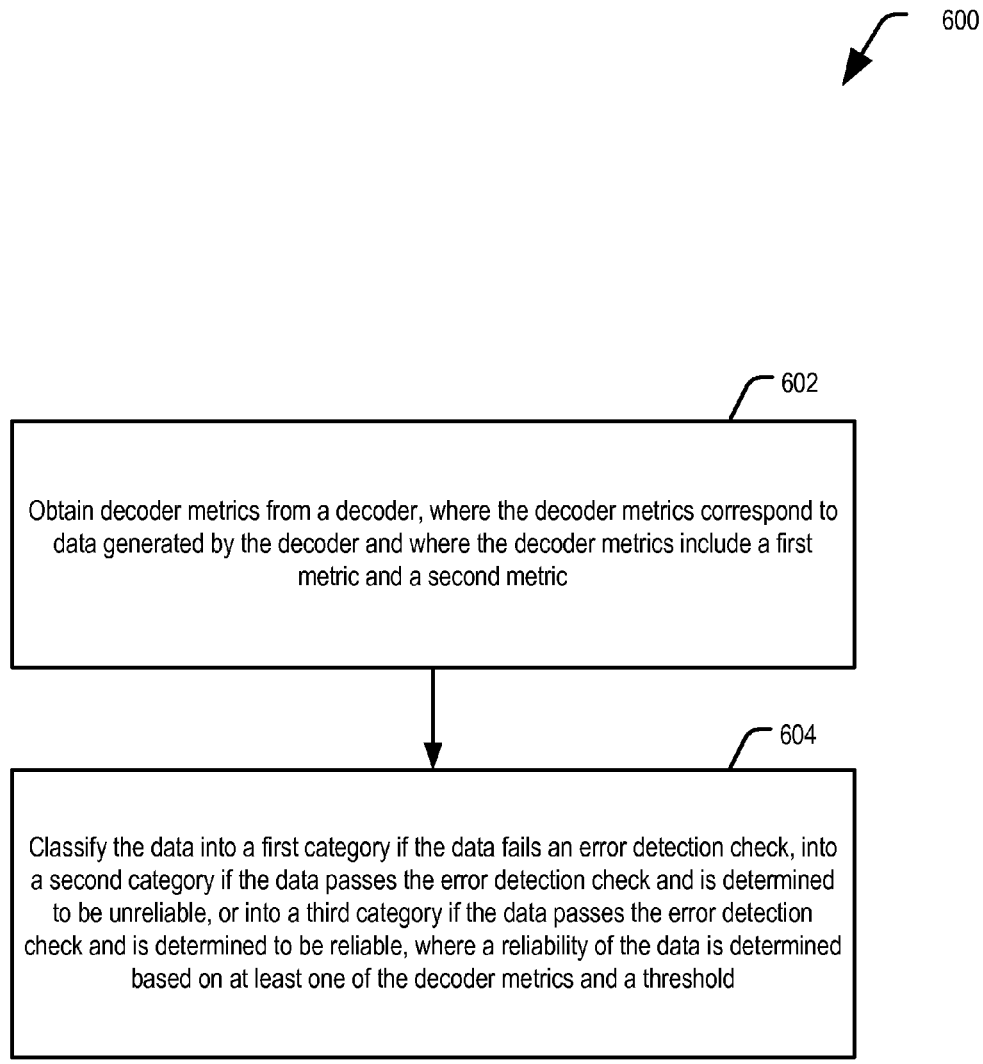
FIG. 6 is a flow chart of a particular embodiment of a method of data classification for use in a wireless communication system.

Referring to FIG. 6, a particular illustrative embodiment of a method of data classification for use in a wireless communication system is illustrated. The method 600 includes obtaining decoder metrics from a decoder, at 602. For example, the logic 116 of FIGS. 1 and 2 may obtain the decoder metrics 124 from the decoder 106. The decoder metrics correspond to data generated by the decoder. For example, the decoder metrics 124 of FIGS. 1 and 2 may correspond to data 120, which is generated by the decoder 106. The decoder metrics include a first metric and a second metric, such as a scale invariant metric (e.g., SER) and a scale variant metric (e.g., EM).

The data is classified into a first category if the data fails an error detection check, into a second category if the data passes the error detection check and is determined to be unreliable, or into a third category if the data passes the error detection check and is determined to be reliable, at 604. For example, the classifier 108 of FIGS. 1 and 2 may classify the data 120 into the first category if the data 120 fails an error detection check. The classifier 108 of FIGS. 1 and 2 may classify the data 120 into the second category if the data 120 passes the error detection check and is determined to be unreliable. The classifier 108 of FIGS. 1 and 2 may also classify the data 120 into the third category if the data 120 passes the error detection check and is determined to be reliable. A reliability of the data is determined based on the decoder metrics and a metric threshold. For example, a reliability of the data 120 in FIG. 2 may be determined based on the decoder metrics 124 and a metric threshold.

The method 600 of FIG. 6 may be implemented by an application-specific integrated circuit (ASIC), a field-programmable gate array (FPGA) device, a processing unit such as a central processing unit (CPU), a digital signal processor (DSP), a controller, another hardware device, a firmware device, or any combination thereof. As an example, the method of FIG. 6 can be performed by or in response to signals or commands from a processor that executes instructions, as described with respect to FIG. 6.

Figure 7:
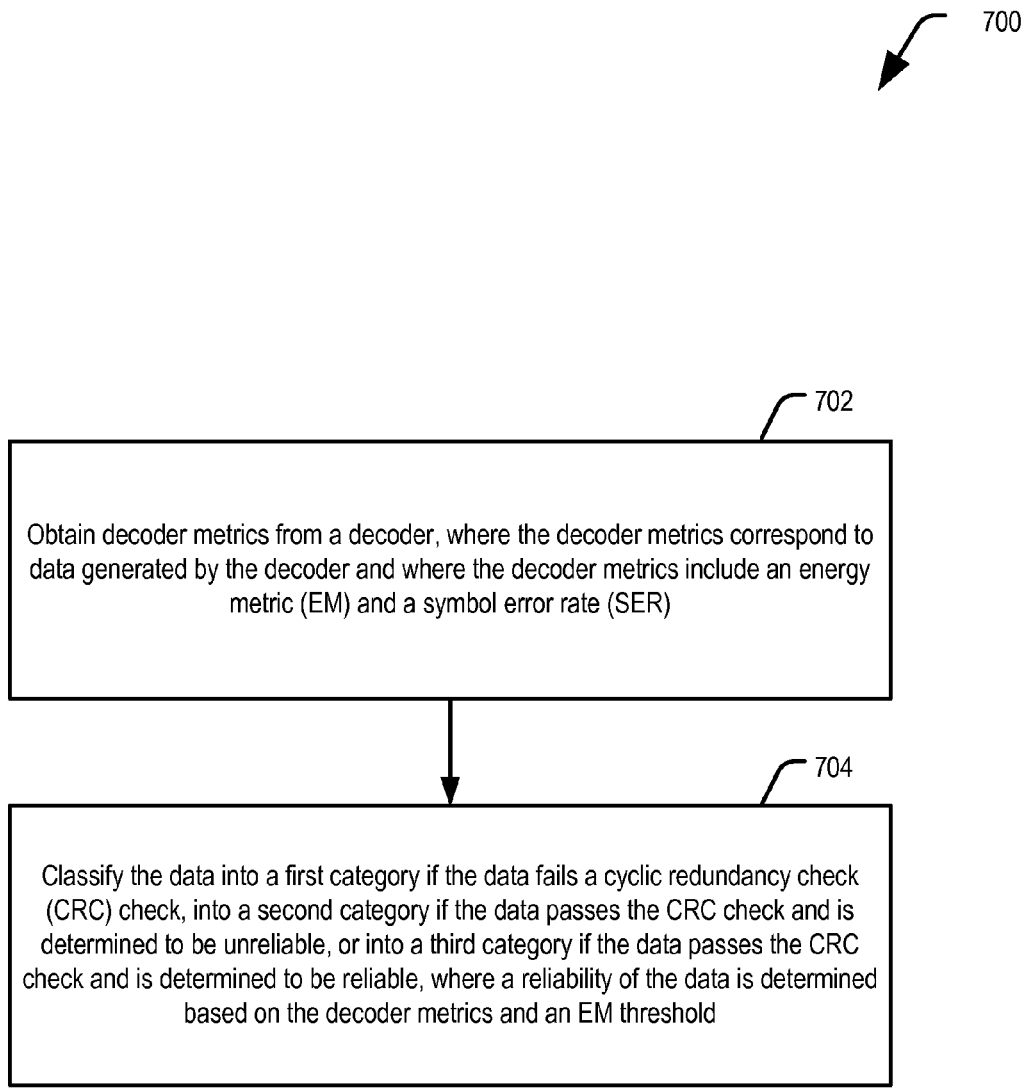
FIG. 7 is a flow chart of a particular illustrative embodiment of a method of data classification for use in a wireless communication system.

Referring to FIG. 7, a particular illustrative embodiment of a method of data classification for use in a wireless communication system is illustrated. The method 700 includes obtaining decoder metrics from a decoder, at 702. For example, the logic 116 of FIGS. 1 and 2 may obtain the decoder metrics 124 from the decoder 106. The decoder metrics correspond to data generated by the decoder. For example, the decoder metrics 124 of FIGS. 1 and 2 may correspond to data 120, which is generated by the decoder 106. The decoder metrics include an SER and an EM.

The data is classified into a first category if the data fails a cyclic redundancy check (CRC) check, into a second category if the data passes the CRC check and is determined to be unreliable, or into a third category if the data passes the CRC check and is determined to be reliable, at 704. For example, the classifier 108 of FIG. 2 may classify the data 120 into a fail category if the data 120 fails a cyclic redundancy check (CRC) check. The classifier 108 of FIG. 2 may classify the data 120 into a false CRC pass category if the data 120 passes the CRC check and is determined to be unreliable. The classifier 108 of FIG. 2 may also classify the data 120 into a pass category if the data 120 passes the CRC check and is determined to be reliable. A reliability of the data is determined based on the decoder metrics and an EM threshold. For example, a reliability of the data 120 in FIG. 2 may be determined based on the decoder metrics 124 and an EM threshold.

The method 700 of FIG. 7 may be implemented by a processing unit such as a central processing unit (CPU), a digital signal processor (DSP), a controller, an application-specific integrated circuit (ASIC), a field-programmable gate array (FPGA) device, another hardware device, a firmware device, or any combination thereof. As an example, the method of FIG. 7 can be performed by or in response to signals or commands from a processor that executes instructions, as described with respect to FIG. 6.

Figure 8:
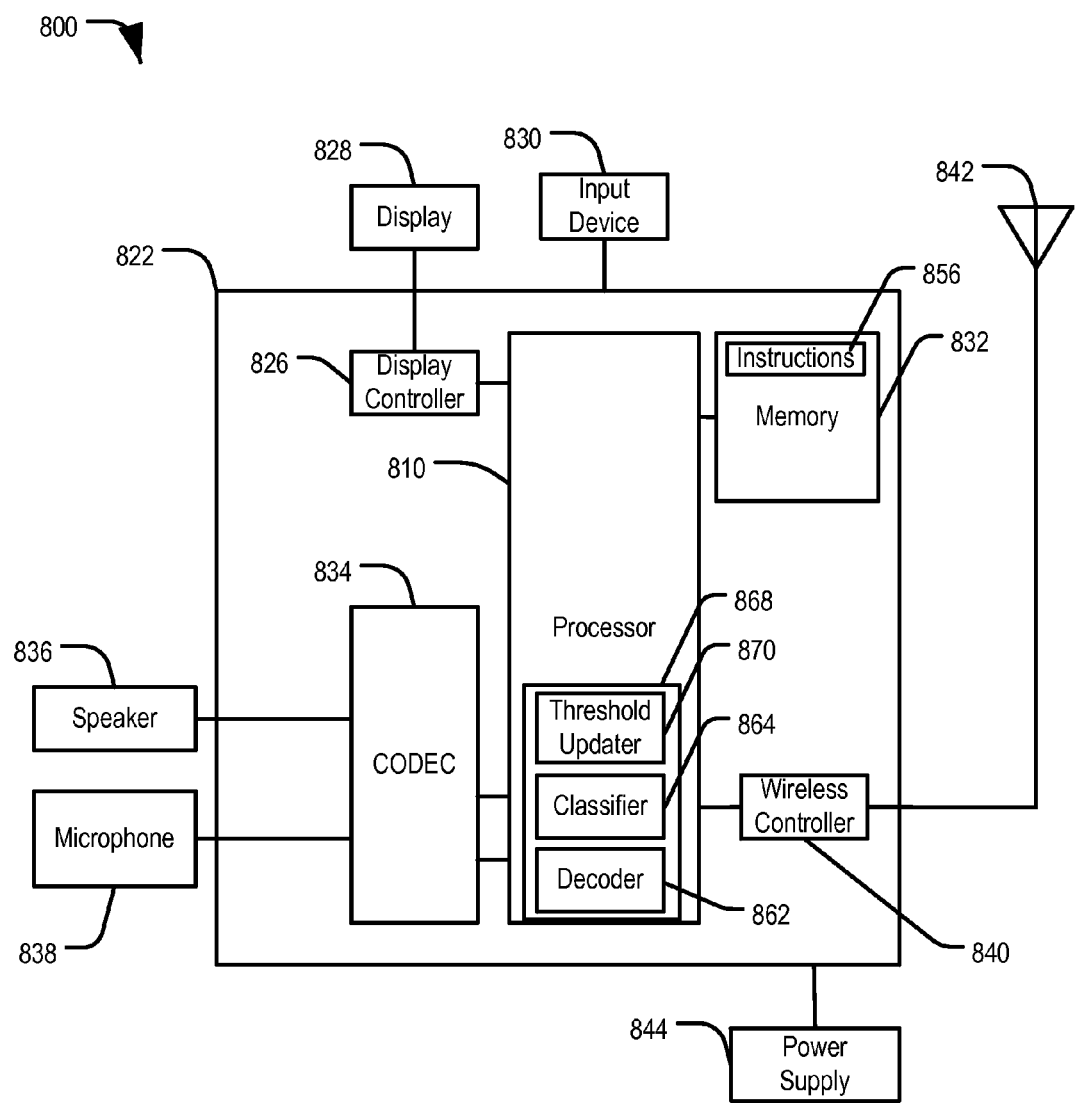
FIG. 8 is a block diagram of wireless device that can perform data classification for use in a wireless communication system.

Referring to FIG. 8, a block diagram of a particular illustrative embodiment of a wireless communication device is depicted and generally designated 800. The device 800 includes a processor 810, such as a digital signal processor (DSP), coupled to a memory 832. The wireless communication device 800 may include a false alarm detector 868. The false alarm detector 868 includes a decoder 862, a classifier 864, and a threshold updater 870, such as the decoder 106, the classifier 108, and the threshold updater 210 of FIG. 2. In an illustrative embodiment, the false alarm detector 868 may correspond to the device, 104 of FIG. 1 or of FIG. 2, or may operate according to one or more of the methods of FIG. 3, FIG. 6, or FIG. 7, or any combination thereof. Although the false alarm detector 868 is illustrated as integrated within the processor 810, in another embodiment, the device for data classification for use in a wireless communication system 868 may be external to the processor 810 and coupled to the processor 810.

At least a portion of the false alarm detector 868 may be implemented as instructions executing, at the processor 810. For example, the memory 832 may be a non-transitory computer readable medium storing computer-executable instructions 856 that are executable by the processor 810 (e.g. a computer) to cause the processor unit 810 to obtain decoder metrics from a decoder, where the decoder metrics correspond to data generated by the decoder and where the decoder metrics include a symbol error rate (SER) and an energy metric (EM). Additionally, the computer-executable instructions 856 may include instructions that are executable by the processor unit 810 to cause the processor 810 to classify the data into a first category if the data fails a cyclic redundancy check (CRC) check, into a second category if the data passes the CRC check and is determined to be unreliable, or into a third category if the data passes the CRC check and is determined to be reliable, where a reliability of the data is determined based on the decoder metrics and an EM threshold.

In addition, the memory 832 may be a non-transitory computer readable medium storing computer-executable instructions 856 that are executable by the processor 810 (e.g. a computer) to cause the processor unit 810 to obtain decoder metrics from a decoder, where the decoder metrics correspond to data generated by the decoder and where the decoder metrics include a first metric and a second metric. Further, the computer-executable instructions 856 may include instructions that are executable by the processor 810 to cause the processor 810 to classify the data into a first category if the data fails an error detection check, into a second category if the data passes the error detection check and is determined to be unreliable, or into a third category if the data passes the error detection check and is determined to be reliable, where a reliability of the data is determined based on the decoder metrics and a threshold value.

FIG. 8 also shows a display controller 826 that is coupled to the digital signal processor 810 and to a display 828. A coder/decoder (CODEC) 834 can also be coupled to the digital signal processor 810. A speaker 836 and a microphone 838 can be coupled to the CODEC 834.

FIG. 8 also indicates that a wireless controller 840 can be coupled to the processor 810 and to a wireless antenna 842. In a particular embodiment, the processor 810, the display controller 826, the memory 832, the CODEC 834, and the wireless controller 840 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the wireless antenna 842, and the power supply 844 are external to the system-on-chip device 822. However, each of the display 828, the input device 830, the speaker 836, the microphone 838, the wireless antenna 842, and the power supply 844 can be coupled to a component of the system-on-chip device 822, such as an interface or a controller.

While FIG. 8 illustrates a particular embodiment of a wireless device 800 including false alarm detector 868, in other embodiments, the false alarm detector 868 may be integrated in other electronic devices including a set top box, a music player, a video player, an entertainment unit, a navigation device, a communications device, a personal digital assistant (PDA), a fixed location data unit, and a computer.

In conjunction with described embodiments, a system is disclosed that includes means for obtaining decoder metrics from the decoder, where the decoder metrics correspond to data generated by a decoder and where the decoder metrics include a symbol error rate (SER) and an energy metric (EM). For example, the means for obtaining decoder metrics from a decoder may include the logic 116 of FIG. 1, one or more other devices or circuits configured to obtain decoder metrics from a decoder, or any combination thereof.

The system may also includes means for classifying data into a first category if the data fails a cyclic redundancy check (CRC) check, into a second category if the data passes the CRC check and is determined to be unreliable, or into a third category if the data passes the CRC check and is determined to be reliable, where a reliability of the data is determined based on the decoder metrics and an EM threshold. For example, the means for classifying data may include the classifier 108 of FIG. 1, the classifier 108 of FIG. 2, one or more other devices or circuits configured to classify data, or any combination thereof.

In conjunction with described embodiments, a system is disclosed that includes means for obtaining decoder metrics from the decoder, where the decoder metrics correspond to data generated by a decoder and where the decoder metrics include a first metric and a second metric. For example, the means for obtaining decoder metrics from a decoder may include the logic 116 of FIG. 1, one or more other devices or circuits configured to obtain decoder metrics from a decoder, or any combination thereof.

The system may also includes means for classifying data into a first category if the data fails an error detection check, into a second category if the data passes the error detection check and is determined to be unreliable, or into a third category if the data passes the error detection check and is determined to be reliable, where a reliability of the data is determined based on the decoder metrics and a metric threshold. For example, the means for classifying data may include the classifier 108 of FIG. 1, the classifier 108 of FIG. 2, one or more other devices or circuits configured to classify data, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of data classification for use in a wireless communication system, the method comprising:
   obtaining decoder metrics from a decoder, wherein the decoder metrics correspond to data generated by the decoder and wherein the decoder metrics include a symbol error rate (SER) and an energy metric (EM); and
   classifying the data into a first category if the data fails a cyclic redundancy check (CRC) check, into a second category if the data passes the CRC check and is determined to be unreliable, or into a third category if the data passes the CRC check and is determined to be reliable, wherein a reliability of the data is determined based on the decoder metrics and an EM threshold.

2. The method of claim 1, wherein the data is determined to be unreliable if the SER satisfies a first SER threshold.

3. The method of claim 1, wherein the data is determined to be unreliable if the SER satisfies a first SER threshold and the EM fails to satisfy the EM threshold.

4. The method of claim 1, wherein the data is determined to be unreliable if the SER satisfies a first SER threshold, and wherein the data is determined to be unreliable if the SER satisfies a second SER threshold and the EM fails to satisfy the EM threshold.

5. The method of claim 1, wherein the first category corresponds to a fail category, the second category corresponds to a false CRC pass category, and the third category corresponds to a pass category.

6. The method of claim 5, wherein the EM threshold is set to a first threshold value in response to classifying the data in the false CRC pass category.

7. The method of claim 5, further comprising:
receiving the data from the decoder; and
transferring the data to a next communication protocol layer in response to classifying the data in the pass category.

8. The method of claim 1, further comprising updating the EM threshold based on the decoder metrics.

9. The method of claim 8, further comprising initializing the EM threshold to a first threshold value before determining the reliability of the data.

10. The method of claim 8, wherein the EM threshold is updated to a first update threshold value in response to determining that the SER fails to satisfy a low SER threshold.

11. The method of claim 10, wherein the EM threshold is updated to a second update threshold value in response to determining that the SER satisfies a high SER threshold.

12. The method of claim 11, wherein the first update threshold value is determined based on a multiplicative coefficient and an infinite impulse response (IIR) coefficient and wherein the second update threshold value is determined based on the infinite impulse response (IIR) coefficient, the multiplicative coefficient, and the EM.

13. The method of claim 12, wherein the IIR coefficient is between 0 and 1.

14. The method of claim 1, further comprising:
obtaining second decoder metrics corresponding to second data; and
classifying the second data based on the second decoder metrics and an updated threshold value, wherein the second decoder metrics and the second data correspond to a next transmission time interval (TTI).

15. A device for data classification for use in a wireless communication system, the device comprising:
logic to obtain decoder metrics from a decoder, wherein the decoder metrics correspond to data generated by the decoder and wherein the decoder metrics include a symbol error rate (SER) and an energy metric (EM); and
a classifier to classify the data into a first category if the data fails a cyclic redundancy check (CRC) check, into a second category if the data passes the CRC check and is determined to be unreliable, or into a third category if the data passes the CRC check and is determined to be reliable, wherein a reliability of the data is determined based on the decoder metrics and an EM threshold.

16. The device of claim 15, wherein the data is determined to be unreliable if the SER satisfies a first SER threshold and the EM fails to satisfy the EM threshold.

17. The device of claim 15, wherein the data is determined to be unreliable if the SER satisfies a first SER threshold, and wherein the data is determined to be unreliable if the SER satisfies a second SER threshold and the EM fails to satisfy the EM threshold.

18. The device of claim 15, wherein the first category corresponds to a fail category, the second category corresponds to a false CRC pass category, and the third category corresponds to a pass category.

19. The device of claim 15, further comprising a threshold updater to update the EM threshold based on the decoder metrics.

20. The device of claim 15, wherein the decoder is a Viterbi decoder for convolutional codes.

21. The device of claim 15, wherein the decoder metrics and the data are associated with a same transmission time interval (TTI).

22. The device of claim 15, wherein the data is associated with a transmission time interval (TTI) and the decoder metrics are associated with a prior TTI.

23. An apparatus for data classification for use in a wireless communication system, the apparatus comprising:
means for obtaining decoder metrics from a decoder, wherein the decoder metrics correspond to data generated by the decoder and wherein the decoder metrics include a symbol error rate (SER) and an energy metric (EM);
means for classifying the data into a first category if the data fails a cyclic redundancy check (CRC) check, into a second category if the data passes the CRC check and is determined to be unreliable, or into a third category if the data passes the CRC check and is determined to be reliable, wherein a reliability of the data is determined based on the decoder metrics and an EM threshold.

24. The apparatus of claim 23, wherein the data is determined to be unreliable if the SER satisfies a first SER threshold, and wherein the data is determined to be unreliable if the SER satisfies a second SER threshold and the EM fails to satisfy the EM threshold.

25. The apparatus of claim 23, wherein the first category corresponds to a fail category, the second category corresponds to a false CRC pass category, and the third category corresponds to a pass category.

26. The apparatus of claim 23, further comprising means for updating the EM threshold based on the decoder metrics.

27. A non-transitory processor-readable storage medium comprising instructions that, when executed by a processor, cause the processor to:
obtain decoder metrics from a decoder, wherein the decoder metrics correspond to data generated by the decoder and wherein the decoder metrics include a symbol error rate (SER) and an energy metric (EM); and
classify the data into a first category if the data fails a cyclic redundancy check (CRC) check, into a second category if the data passes the CRC check and is determined to be unreliable, or into a third category if the data passes the CRC check and is determined to be reliable, wherein a reliability of the data is determined based on the decoder metrics and an EM threshold.

28. The non-transitory processor-readable storage medium of claim 27, wherein the data is determined to be unreliable if the SER satisfies a first SER threshold, and wherein the data is determined to be unreliable if the SER satisfies a second SER threshold and the EM fails to satisfy the EM threshold.

29. The non-transitory processor-readable storage medium of claim 27, wherein the first category corresponds to a fail category, the second category corresponds to a false CRC pass category, and the third category corresponds to a pass category.

30. The non-transitory processor-readable storage medium of claim 27, further comprising instructions that, when executed by the processor, cause the processor to update the EM threshold based on the decoder metrics.

* * * * *